United States Patent
Bond et al.

(10) Patent No.: US 10,152,682 B2
(45) Date of Patent: Dec. 11, 2018

(54) CONFIGURABLE DATA ACCUMULATORS

(71) Applicant: Toshiba Global Commerce Solutions Holdings Corporation, Tokyo (JP)

(72) Inventors: Julia Patten Bond, Youngsville, NC (US); William James Noonan, Cary, NC (US); Kavita Prasad, Bangalore (IN); David Thomas Rogers, Wake Forest, NC (US); Kathiresan R. Selvaraj, Bangalore (IN)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 739 days.

(21) Appl. No.: 14/280,381

(22) Filed: May 16, 2014

(65) Prior Publication Data

US 2014/0343979 A1 Nov. 20, 2014

Related U.S. Application Data

(60) Provisional application No. 61/929,544, filed on Jan. 21, 2014, provisional application No. 61/824,351, filed on May 16, 2013.

(51) Int. Cl.
*G06Q 10/00* (2012.01)
*G06Q 10/06* (2012.01)
(Continued)

(52) U.S. Cl.
CPC ..... *G06Q 10/063* (2013.01); *G06F 17/30339* (2013.01); *G06Q 20/0453* (2013.01);
(Continued)

(58) Field of Classification Search
CPC .......... G06Q 20/0453; G06Q 30/0207; G06Q 20/209
See application file for complete search history.

(56) References Cited

U.S. PATENT DOCUMENTS 5,623,540 A * 4/1997 Morrison ................ H04M 3/36
379/111
5,774,872 A 6/1998 Golden et al.
(Continued)

FOREIGN PATENT DOCUMENTS

WO 1992004679 A1 3/1992

OTHER PUBLICATIONS

International Search Report for PCT/US14/38482, dated Oct. 10, 2014.
(Continued)

*Primary Examiner* — Stephanie Z Delich
(74) *Attorney, Agent, or Firm* — Patterson + Sheridan, LLP

(57) ABSTRACT

Embodiments provide techniques for creating and managing accumulator tables for use in generating reports for a business entity. Embodiments include identifying a report for a business entity. A plurality of data fields are determined across two or more database tables that are used to generate the report. Embodiments include creating an accumulator table and populating the accumulator table with data values for all of the plurality of data fields. Upon receiving, from a point of sale system, an indicator of an occurrence of a business event for the business entity, an instance of the report is automatically generated using the populated accumulator table.

20 Claims, 5 Drawing Sheets

(51) Int. Cl.

| | | |
|---|---|---|
| *G06F 17/30* | (2006.01) | |
| *H04L 29/08* | (2006.01) | |
| *G06Q 30/02* | (2012.01) | |
| *G06Q 20/20* | (2012.01) | |
| *G06Q 20/04* | (2012.01) | |
| *G07G 5/00* | (2006.01) | |

(52) U.S. Cl.
CPC ....... *G06Q 20/209* (2013.01); *G06Q 30/0207* (2013.01); *G06Q 30/0238* (2013.01); *G07G 5/00* (2013.01); *H04L 29/08189* (2013.01); *H04L 67/10* (2013.01); *H04L 67/1012* (2013.01)

(56) References Cited

U.S. PATENT DOCUMENTS

| | | | |
|---|---|---|---|
| 5,774,879 | A | 6/1998 | Custy et al. |
| 6,064,986 | A | 5/2000 | Edelman |
| 6,219,689 | B1 | 4/2001 | Mori |
| 6,925,468 | B1* | 8/2005 | Bobbitt ............ G06F 17/30286 705/35 |
| 8,504,477 | B1 | 8/2013 | Copes et al. |
| 8,548,859 | B2 | 10/2013 | Matkovic |
| 8,606,698 | B2 | 12/2013 | Schultz et al. |
| 2002/0046191 | A1 | 4/2002 | Joao |
| 2003/0236694 | A1 | 12/2003 | Liu et al. |
| 2004/0176864 | A1* | 9/2004 | Cocco ................ G05B 19/4183 700/108 |
| 2005/0240556 | A1 | 10/2005 | Larson et al. |
| 2009/0037242 | A1 | 2/2009 | Ventura et al. |
| 2009/0043762 | A1* | 2/2009 | Shiverick .......... G06F 17/30395 |
| 2009/0182795 | A1 | 7/2009 | Dobbek et al. |
| 2009/0276280 | A1* | 11/2009 | Whitsitt ................. G06Q 10/06 705/16 |
| 2009/0327045 | A1 | 12/2009 | Olives et al. |
| 2011/0106840 | A1 | 5/2011 | Barrett et al. |
| 2012/0036109 | A1 | 2/2012 | Blazejewski et al. |
| 2012/0054247 | A1* | 3/2012 | Jiang ................. G06F 17/30961 707/797 |
| 2012/0253954 | A1 | 10/2012 | Wong |
| 2013/0018849 | A1 | 1/2013 | Johnston et al. |
| 2013/0117107 | A1 | 5/2013 | Evans |
| 2013/0246269 | A1 | 9/2013 | Roberts et al. |
| 2013/0268379 | A1 | 10/2013 | Anderson et al. |

OTHER PUBLICATIONS

PR Newswire Association, LLC "ShopperTrak Launches Industry's First Hosted Real-Time Reporting Tool Across an Entire Network of Stores", Jan. 13, 2014, pp. 1-2.

Computer Weekly News; ForwardMetrics Corp.; Salesforce on Steroids: ForwardMetrics Rolls Out Software Update That Includes Instant Access to Salesforce Data, Dec. 5, 2013, pp. 1-2.

PR Newswire Association LLC; "Decentrix Launches AffTraq, a Web-Based Application for Automating Affiliate Management; Web-Based Technology Moves Affiliate Marketing Programs Into the Future Through the Use of Real-Time Affiliate Sales Management, Tracking, and Reporting, Tools", Apr. 27, 2004, pp. 1-2.

* cited by examiner

CONFIGURABLE DATA ACCUMULATORS

CROSS-REFERENCE TO RELATED APPLICATIONS

This application claims priority to U.S. Provisional Patent Application 61/824,351, filed May 16, 2013 and to U.S. Provisional Patent Application 61/929,544, filed Jan. 21, 2014. The aforementioned provisional patent applications are herein incorporated by reference in their entirety.

BACKGROUND

The present disclosure relates to report generation, and more specifically, to techniques for generating reports for a business entity through the use of accumulator tables and without join operations for multiple database tables.

In a database management system (DBMS), data can be stored in one or more data containers and each container can contain records. Data within each of the records can be organized into one or more fields. In a relational database system, such data containers are typically referred to as tables, the records are typically referred to as rows, and the fields are referred to as columns. Generally, in database environments, users store, update and retrieve information by submitting commands (e.g., a query) to a database server. In order for such commands to be processed correctly, the commands must comply with a language supported by the database server (e.g., Structured Query Language (SQL)).

Generally, a "join" refers to a query that combines rows from two or more tables within a database. For example, for a query composed using SQL, a join is performed whenever multiple tables appear in the FROM clause of the SQL query. The columns of data to be retrieved from the tables can be listed in the SQL query's SELECT clause, and the query's SELECT list can include columns from any of the base tables listed in the FROM clause. Typically, most join queries contain WHERE clause conditions that compare two columns, each from a different table, and such a condition is commonly referred to as a join condition. When a DBMS executes a join, the DBMS combines pairs of rows for which the join condition evaluates to TRUE, where each pair contains one row from each table. When executing a join involving three or more tables, a DBMS can join two of the tables based on the join conditions comparing their columns, and the DBMS can then join the result to another one of the tables based on join conditions containing columns of the already joined tables and the other table. The DBMS could then continue this process until all tables specified in the query are joined into the result. Generally, such queries are much more computationally expensive than queries that reference a single table and joins involving many different tables can involve a significant number of row combinations and thus can consume considerable computational resources, particularly when dealing with tables containing a significant number of rows.

In a retail environment, businesses oftentimes generate reports for business transaction data on a regular basis. For example, a business could generate a daily accounting report at a particular time each day, e.g., 8:00 pm if the business closes at 8:00 pm daily. One consequence to generating reports according to a fixed schedule is that, in practice, businesses may not operate exactly according to such a fixed schedule. For example, although the business may post their closing time as 8:00 pm, the business could stay open slightly later on nights when multiple customers are still in the store at 8:00 pm. However, if the reports are configured to run at exactly 8:00 pm, the generated reports may not include the transaction data for the business generated after 8:00 pm. As a result, the reports may be incomplete and the reports may need to be run regenerated, thus wasting computational resources.

SUMMARY

One embodiment provides a method for creating and managing accumulator tables for use in generating reports for a business entity. The method includes identifying a report for a business entity. Additionally, the method includes determining a plurality of data fields across two or more database tables that are used to generate the report. The method also includes creating an accumulator table and populating the accumulator table with data values for all of the plurality of data fields. The method further includes, upon receiving, from a point of sale system, an indicator of an occurrence of a business event for the business entity, automatically generating an instance of the report using the populated accumulator table.

Other embodiments include a computer-readable medium and a system for carrying out the aforementioned method.

DETAILED DESCRIPTION

Generally, embodiments provide techniques for creating and managing accumulator tables for use in generating reports for a business entity. Embodiments include identifying a report for a business entity. For example, such a report could comprise a daily accounting of all transactions for the business on the day in question. Embodiments can then determine a plurality of data fields across two or more database tables that are used to generate the report. Of note, while such a report could be generated by performing a join across the two or more database tables, such a join operation can be very computationally expensive, particularly when involving a significant number of database tables with a significant number of rows.

As such, embodiments can include creating an accumulator table and populating the accumulator table with data values for all of the plurality of data fields. In one embodiment, the accumulator table stores only data related to the report in question. Additionally, the two or more database tables can still be populated with the data values, even though the accumulator table is also populated with the data values pertaining to the report. Upon receiving, from a point of sale system, an indicator of an occurrence of a business event for the business entity, an instance of the report is automatically generated using the populated accumulator table. Thus, by generating the report using only the accumulator table, embodiments avoid having to perform any join operations for the two or more database tables, thereby reducing the computational cost of generating the report. Moreover, by generating the report responsive to a business event (e.g., a store close event), rather than, e.g., a predetermined point in time, embodiments ensure that the generated report is complete and does not omit any data (e.g., data collected after hours due to a business staying open late).

Figure 1:
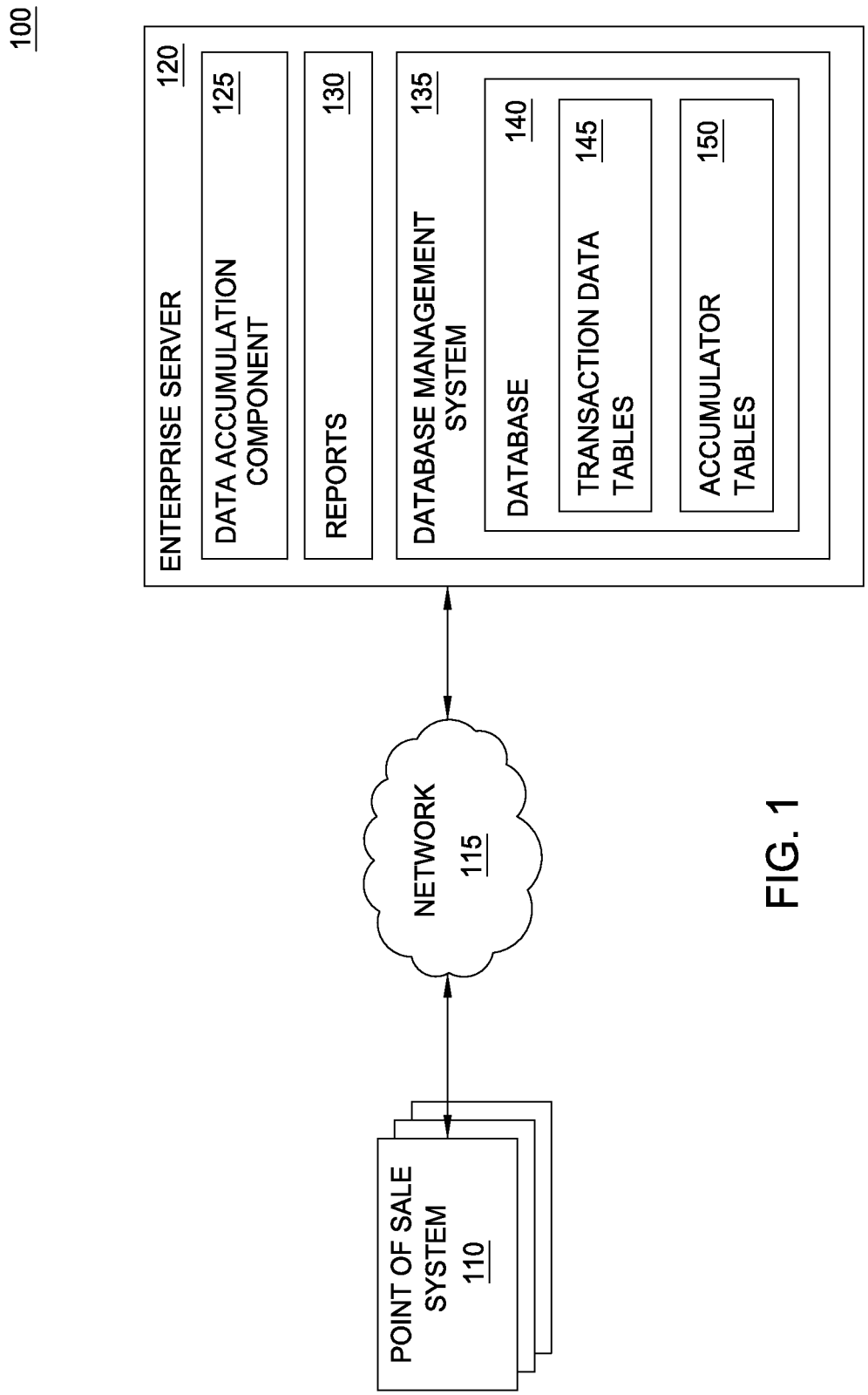
FIG. 1 is a block diagram illustrating a point of sale environment including an enterprise server configured with a data accumulation component, according to one embodiment described herein.

FIG. 1 is a block diagram illustrating a point of sale environment including an enterprise server configured with a data accumulation component, according to one embodiment described herein. As shown, the system 100 includes a plurality of point of sale systems 110 connected to an enterprise server 120 by a network 115. For example, the point of sale systems 110 could physically reside within a retail establishment, the enterprise server 120 could reside within a cloud computing environment, and the network 115 could represent the Internet. The enterprise server 120 includes a data accumulation component 125, a plurality of reports 130, and a database management system (DBMS) 135. The DBMS includes a database 140, which in turn includes transaction data tables 145 and accumulator tables 150.

Generally, the data accumulation component 125 can analyze the reports 130 to identify a report generated using data fields across two or more of the transaction data tables 145. As discussed above, such a report can be computationally expensive to generate, as it may require computationally expensive join operation(s) for the two or more transaction data tables 145. This is particularly true when the transaction data tables 145 in question contain a significant number of rows. A database join operation generally refers to an operation to combine records from two or more distinct tables within a database. The set of records produced by the join operation can then be saved as a new table within the database or used as is. According to particular join operations, in order to join records from the two or more tables, the records must have at least one common value across the two or more tables. Other join operations do not each record in the two or more tables being join to have a matching record.

According to the ANSI-standard structured query language (SQL), there are five distinct types of join operations: inner join, left outer join, right outer join, full outer join and cross join. A cross join operation generally returns the Cartesian product of rows from the two or more tables referenced by the join operation, thereby producing a result set that includes rows which combine each row from a first of the two or more tables with each row from the second table.

An inner join is a join operation used to create a new result table by combining common values from two tables based on a join predicate. For instance, a query could compare each row of the first table with each row of the second table to find all pairs of rows satisfying the join predicate, and could combine the values for each pair of rows to create a new row in the new result table. As an example, the result of an inner join can be defined as the result produced by taking the Cartesian product of all records in the two or more tables and then returning only the records that satisfy the join predicate. An inner join operation may be more computationally expensive than an equivalent cross join operation, as the inner join operation includes a cross join operation as well as operations to return only the records satisfying the join predicate.

An outer join operation is an example of a join operation that does not require each record in the joined tables to have a matching record. A left outer join, for example, returns all the records of a "left" table, even if the join-condition does not find a corresponding matching record in the "right" table. In the event no matching records are found in the right table, the left outer join operation could return a NULL value in each column of the right table. Conversely, a right outer join includes every row from the "right" table in the joined table, and in the event no matching row in the "left" table exists, a NULL value will be included in the columns of the "left" table for which no match was found.

An example will now be discussed with respect to the Tables 1 and 2 depicted below.

TABLE 1

Transaction_Totals

| TransactionID | TotalAmount |
|---|---|
| 3333 | $19.99 |
| 4444 | $49.99 |
| 5555 | $149.99 |
| 6666 | $37.99 |

TABLE 2

Cashier_Data

| CashierID | TransactionID |
|---|---|
| 3 | 4444 |
| 7 | 5555 |
| 3 | 3333 |

For the Tables 1 and 2, a cross join operation (also referred to as an inner join operation) could be performed by, e.g., submitting a query such as "SELECT*FROM transaction_totals INNER JOIN cashier_data ON transaction_totals.TransactionID=cashier_data.TransactionID;". Upon receiving such a query, the database system could create a new result table by combining values from Table 1 and Table 2, based on the specified join predicate of "transaction_totals.TransactionID=cashier_data.TransactionID." For example, the result table produced from executing such a query could be the Table 3, shown below.

TABLE 3

Result Table

| TransactionID | TotalAmount | CashierID | TransactionID |
|---|---|---|---|
| 3333 | $19.99 | 3 | 3333 |
| 4444 | $49.99 | 3 | 4444 |
| 5555 | $149.99 | 7 | 5555 |

Of note, the TransactionID of "6666" in Table 1 having a TotalAmount of "$37.99" has been omitted from Table 3, because the record does not having any matching records in Table 2 (i.e., no records in Table 2 have a TransactionID value of "6666". Of note, while this example of an inner join operation is relatively simple, such an operation can quickly become complex and computationally expensive when multiple tables are involved, particularly when the tables are significant in size and contain a substantial number of rows and columns.

As another example, a full outer join operation is a join operation which conceptually combines a left outer join with a right outer join. In a full outer join, where records from one table do not match records in the other table, the result set will have NULL values for every column lacking a matching row in the other table. For matching records, a single row is included in the result set containing the corresponding values from each of the tables.

Although join operations are commonly used in practice and many actions have been taken to improve their efficiency, join operations remain computationally expensive to perform. For example, while a user may supply a list of tables to be joined and join conditions to use in carrying out the join operation, the database system must then determine how to perform the join operation and, preferably, what is the most efficient way to perform the join operation. Since multiple different algorithms can oftentimes be used to produce the same result set for a given join operation, the database system may be configured to determine which algorithm(s) is the most efficient to use to carry out a given join operation. In some situations, the effect of a join operation can be obtained through the use of other database operations. For example, a union all operation between an inner join and a select clause can be used to obtain the effect of an outer join. However, while the same result is achieved, these alternate operations can still be computationally expensive to perform. Moreover, the order in which the tables are joined together can potentially have a dramatic impact on the computational cost of the join operation. As such, the database system may be configured to optimize the order in which the tables are joined, in order to minimize the computational cost. Ultimately, however, join operations remain computationally expensive to perform, and an application can optimize its performance and efficiency by minimizing the number of join operations required to execute the application's queries.

As such, embodiments provide techniques for creating and managing accumulator tables for use in generating reports for a business entity, in such a way that the reports can be generated without having to perform any join operations across two or more database tables. For instance, the data accumulation component 125 could generate an accumulator table 150 for the identified report, where the accumulator table 150 includes all of the data fields used in generating the report. The data accumulation component 125 could then populate the accumulator table 150 with transaction data from transactions processed on the point of sale systems 110. For example, when a transaction (e.g., the sale of an item) completes on one of the point of sale systems 110, the enterprise server 120 can contain logic that causes data values for the transaction to be stored in the transaction data tables 145. In such a situation, the data accumulation component 125 could store data values for the corresponding data fields in the accumulator table 150 as well. Thus, the data may be duplicated across the transaction data tables 145 and the accumulator table 150.

At some subsequent point in time, the data accumulation component 125 can generate an instance of the identified report 130 using the accumulator table 150 and without using any of the transaction data tables 145. Thus, by using only the accumulator table 150 and by avoiding the use of the transaction data tables 145 to generate the report, the data accumulation component 125 can generate the report without having to perform any join operations across multiple database tables, thereby making the report generation less computationally expensive to perform. That is, the data accumulation component 125 can consume less computer resources when generating the report by generating the report using only the single accumulator table specifically tailored for the generation of the report, thereby avoiding any computationally expensive join operations that produce a new database table from two or more existing database tables.

In one embodiment, the data accumulation component 125 is configured to generate the report automatically responsive to an occurrence of a business event. For example, a manager of the retail establishment in which the point of sale systems 110 are located could trigger a store close business event at the end of the business day, e.g., using a graphical user interface of one of the point of sale systems 110, indicating that the retail establishment is closed for the remainder of the day. An indication of the business event could be transmitted to the enterprise server 120 from the point of sale system 110, by way of the network 115. The data accumulation component 125 could receive the indication of the business event and could determine a report 130 that corresponds to the business event. For example, a predefined relationship could be established between a daily account report 130 and the store close business event.

The data accumulation component 125 could then automatically generate an instance of the determined report using only the corresponding accumulator table 150 and without using any of the transaction data tables 145. Thus, even though the data used in the report is also stored in the transaction data tables 145, the data accumulation component 125 can avoid performing any join operations when generating the report by using only the data in the corresponding accumulator table 150 instead. Advantageously, doing so provides an efficient way to link report generation to business events of a retail establishment.

Figure 2:
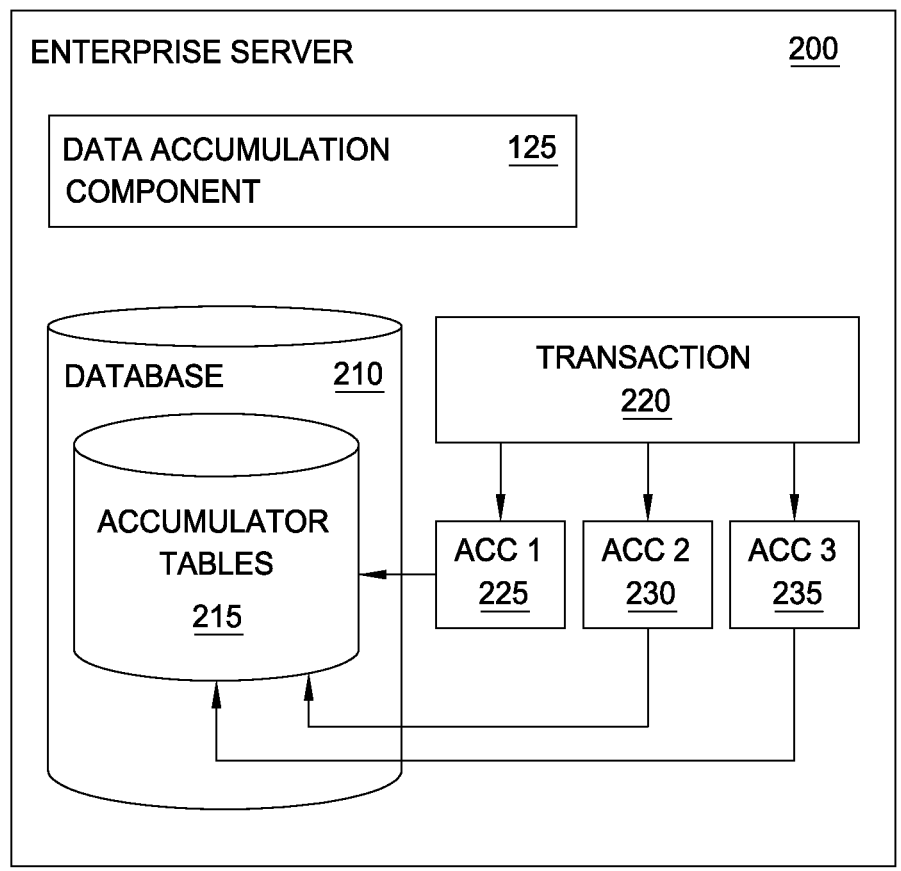
FIG. 2 is a block diagram illustrating an enterprise server configured with a data accumulation component, according to one embodiment described herein.

FIG. 2 is a block diagram illustrating an enterprise server configured with a data accumulation component, according to one embodiment described herein. As shown, the enterprise server 200 includes a data accumulation component 125, a database 210, a transaction object 220 and accumulator flags 225, 230 and 235. As discussed above, the data accumulation component 125 is generally configured to create and maintain the accumulator tables 215 within the database. Here, transaction 220 represents transaction data received from a point of sale system. For example, the transaction 220 could include data relating to items sold, pricing information for said items, payment information, customer information, items returned, additional credits, and so on. More generally, transaction 220 represents any transactional data received from a point of sale system.

The accumulator flags 225, 230 and 235 each correspond to a respective report and a corresponding accumulator table 215. Generally, the accumulator flags 225, 230 and 235 set to indicate whether a particular report is enabled or disabled, and the data accumulation component 125 can be configured to maintain only the accumulator tables 215 whose corresponding accumulator flags 225, 230 and 235 are enabled. For example, assume that the accumulator flag 225 is enabled, indicating that the corresponding report is currently enabled, and that the accumulator flag 230 is disabled, indicating that the corresponding report is currently disabled. In this example, the data accumulation component 125 could determine that a first accumulator table 215 corresponding to the accumulator flag 225 should be maintained and thus could update the first accumulator table 215 with the corresponding data values from the transaction 220. The data accumulation component 125 could further determine that a second accumulator table 215 corresponding to the accumulator flag 230 should not be maintained because the accumulator flag 230 is disabled. Accordingly, the data accumulation component 125 could refrain from updating the second accumulator table 215 corresponding to the accumulator flag 230, since the accumulator flag 230 indicates that report corresponding to the second accumulator table 215 is currently disabled or otherwise inactive. Advantageously, doing so allows the data accumulation component 125 to avoid wastefully maintaining accumulator tables 215 that are not currently being used.

Figure 3:
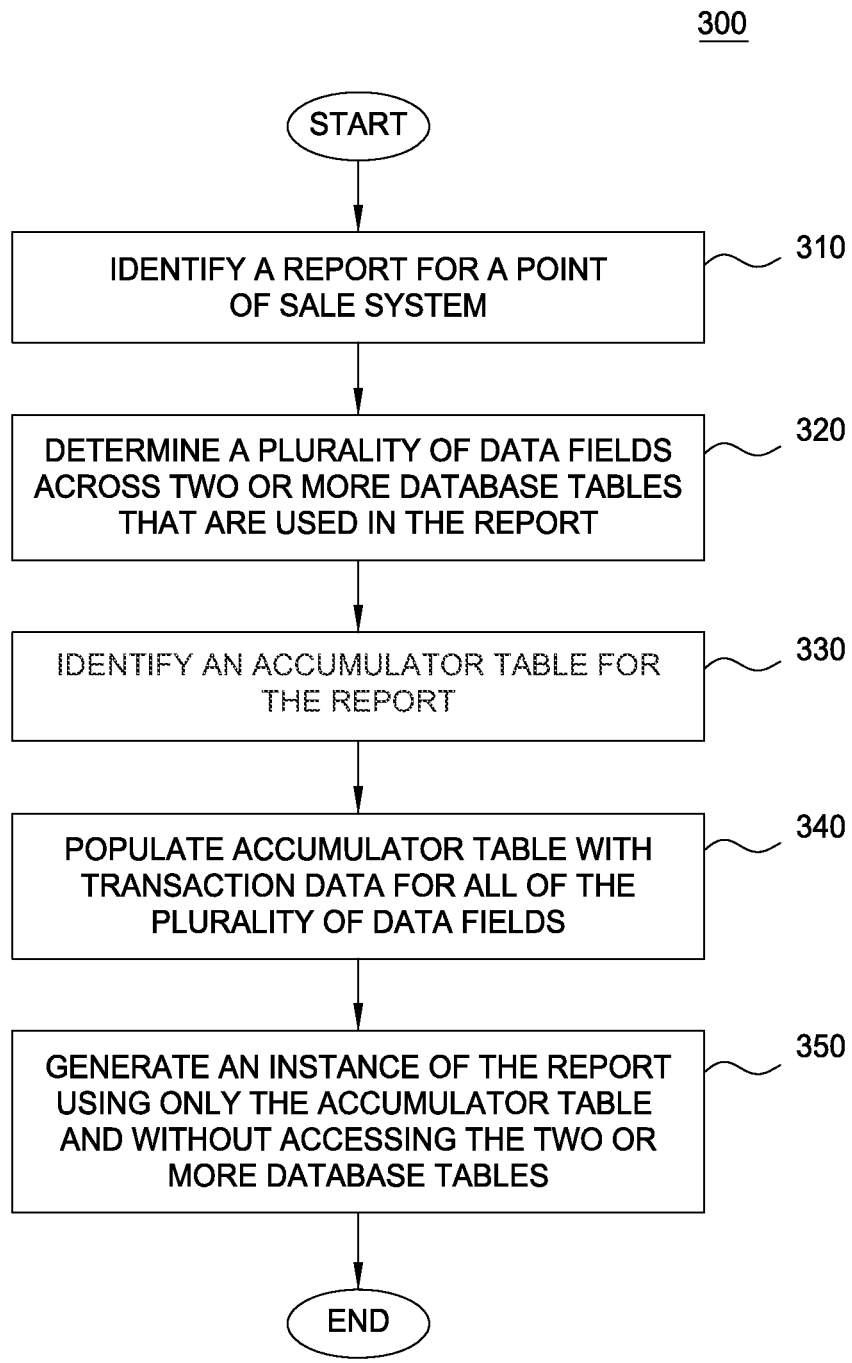
FIG. 3 is a flow diagram illustrating a method for generating a report using accumulator tables, according to one embodiment described herein.

FIG. 3 is a flow diagram illustrating a method for generating a report using accumulator tables, according to one embodiment described herein. As shown, the method 300 begins at block 310, where the data accumulation component 125 identifies a report for a point of sale system. The data accumulation component 125 then determines a plurality of data fields across two or more database tables that are used to generate the report (block 320).

Once the plurality of data fields is determined, the data accumulation component 125 identifies an accumulator table that contains all of the plurality of data fields for the report (block 330). The data accumulation component 125 then populates the generated accumulator table with transaction data for all of the plurality of data fields (block 340). Of note, the two or more database tables can continue to be populated with the data values for the plurality of data fields, even though this data is also being stored within the generated accumulator table, as to do otherwise may affect other reports and services. The data accumulation component 125 then generates an instance of the report using only the accumulator table and without accessing the two or more database tables (block 350), and the method 300 ends. By storing all of the data necessary to generate the report within the accumulate table, the data accumulation component 125 can generate the report without performing any join operations for database tables, thereby reducing the computational cost of generating the report.

Figure 4:
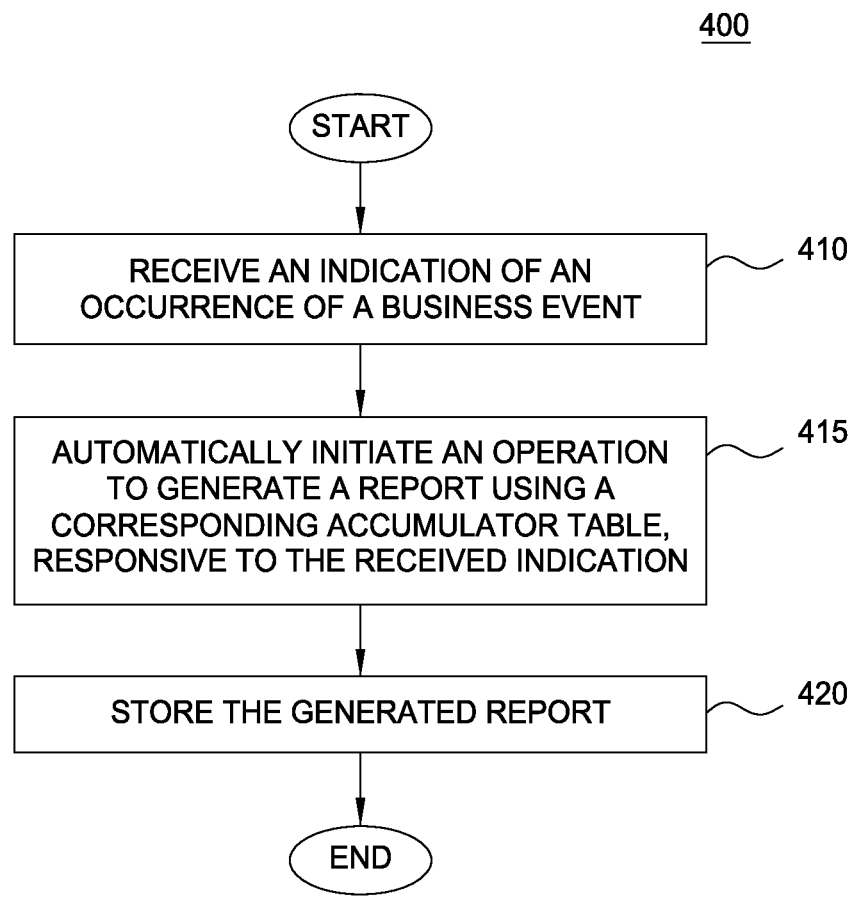
FIG. 4 is a flow diagram illustrating a method for automatically generating a report responsive to a business event, according to one embodiment described herein.

FIG. 4 is a flow diagram illustrating a method for automatically generating a report responsive to a business event, according to one embodiment described herein. As shown, the method 400 begins at block 410, where the data accumulation component 125 receives an indication of an occurrence of a business event. Examples of such a business event include a store open business event and a store close business event. In response to receiving the indication of the occurrence of the business event, the data accumulation component 125 automatically initiates an operation to generate a report using a corresponding accumulator table (block 415). Here, the data accumulation component 125 could determine that a predefined relationship exists between the business event and a particular report(s), and could cause these reports to be automatically generated responsive to the receipt of the indication of the occurrence of the business event. The data accumulation component 125 then stores the generated report (block 420), and the method 400 ends.

Figure 5:
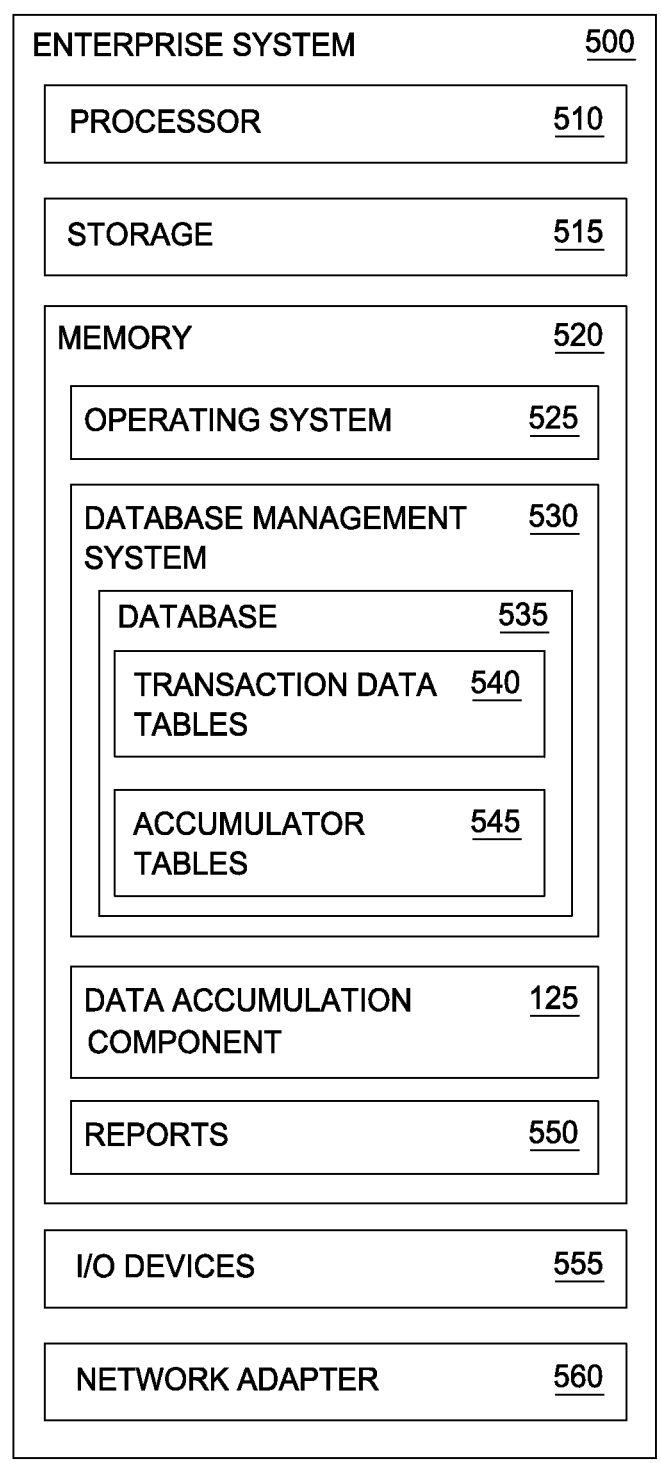
FIG. 5 is a block diagram illustrating an enterprise system configured with a data accumulation component, according to one embodiment described herein.

FIG. 5 is a block diagram illustrating an enterprise system configured with a data accumulation component, according to one embodiment described herein. As shown, the enterprise system 500 includes several hardware components ordinarily included in a general purpose computing system, such as central processing unit (CPU) 510, storage 515 and memory 520. CPU 510 may include any processing element capable of performing the functions described herein. While depicted as a single element within the system 500, CPU 510 is intended to represent a single processor, multiple processors, a processor or processors having multiple cores, as well as combinations thereof. Additionally, storage 515 represents any storage medium communicatively coupled to the system 500, which can include storage devices present within the system 500 (e.g., an internal disk drive) as well as external and remote storage devices accessible by the system 500, such as remote storage available within a cloud computing environment.

The memory 520 may be volatile or non-volatile memory, and may include a random access memory (RAM), Flash memory, cache, disk drives, solid state drives, and the like. Although shown as a single entity, the memory 520 may be divided into different memory elements, such as RAM and one or more hard disk drives. Memory 520 contains an operating system 525, a DBMS 530, a data accumulation component 125 and reports 550. The operating system 525 generally represents any operating system, with examples including versions of Microsoft® Windows®, Linux® and Unix® distributions, and so on. The DBMS 530 includes a database 535, which in turn includes transaction data tables 540 and accumulator tables 545.

The enterprise system 500 further includes I/O devices 555 and a network adapter 560. The system 500 may also include an I/O devices interface (not shown) used to connect to the I/O devices 555. Examples of the I/O devices 555 include, without limitation, a keyboard, a display, mouse devices, and so on. In one embodiment, the network adapter 560 represents a converged network adapter (i.e., a converged network interface controller (C-NIC)). A converged network adapter may include single root I/O virtualization (SR-IOV) adapters such as a Peripheral Component Interconnect Express (PCIe) adapter that supports Converged Enhanced Ethernet (CEE). Another embodiment of the system 500 may include a multi-root I/O virtualization (MR-IOV) adapter. The network adapter 560 may further be used to implement of Fiber Channel over Ethernet (FCoE) protocol, RDMA over Ethernet, Internet small computer system interface (iSCSI), and the like. In general, a network adapter 560 transfers data using an Ethernet or PCI based communication method and may be coupled to one or more of the virtual machines. Additionally, the adapter 560 may facilitate shared access between the virtual machines. While the adapter 560 is shown as being included within the server 500, in other embodiments, the adapter 560 may be a physically distinct device that is separate from the server 500.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments described herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of embodiments described herein may be embodied as a system, method or computer program product. Accordingly, such aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium is defined herein as any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described above with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, the data accumulation component 125 could execute on a computing system within the cloud. In such a case, the data accumulation component 125 could identify a report and could determine a plurality of database fields used to generate the report, wherein the plurality of database fields span two or more database tables. The data accumulation component 125 could then generate an accumulator table and could populate the accumulator table with data for the plurality of database fields. The data accumulation component 125 could then automatically generate an instance of the report using only the accumulator table, thereby avoiding any join operations for the two or more database tables during the generation of the report. Doing so allows a user to access the report information from any computing system attached to a network connected to the cloud (e.g., the Internet).

The flowchart and block diagrams in the Figures illustrate the architecture, functionality, and operation of possible implementations of systems, methods and computer program products according to various embodiments described herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to particular embodiments, other and further embodiments may be devised without departing from the basic scope thereof, and the scope thereof is determined by the claims that follow.

What is claimed is:

1. A computer-implemented method of report generation based on accumulator tables, the computer-implemented method comprising:
   identifying a report for a business entity, the report having an associated accumulator flag;
   determining a plurality of data fields across two or more database tables that are used to generate the report, wherein the two or more database tables are located within a database managed by a database management system;
   creating an accumulator table within the database, the accumulator table including one or more of the determined plurality of data fields;
   upon determining that a first transaction event for the business entity has completed successfully on a point of sale system and that the accumulator flag associated with the report is enabled, automatically populating, by operation of one or more computer processors, the accumulator table with at least one data value from the first transaction event and corresponding to at least one of the plurality of data fields, wherein the at least one data value remains stored in the two or more database tables after populating the accumulator table;
   upon receiving, from the point of sale system, an indicator of an occurrence of a business event for the business entity, automatically generating an instance of the report by submitting one or more database queries for execution against the populated accumulator table, wherein the database management system does not perform a join operation between the two or more database tables in executing the one or more database queries, wherein the report is not generated using any of the two of more database tables; and
   upon determining that the accumulator flag associated with the report is disabled, ceasing the populating of the accumulator table with data values for all of the plurality of data fields.

2. The computer-implemented method of claim 1, wherein the business event comprises at least one of a store open event and a store close event.

3. The computer-implemented method of claim 1, wherein the accumulator table stores data values only for the plurality of data fields used to generate the identified report.

4. The computer-implemented method of claim 1, further comprising:
   upon determining that the accumulator flag associated with the report is enabled, resuming populating of the accumulator table with the at least one data value.

5. The computer-implemented method of claim 1, wherein populating the accumulator table with the at least one data value comprises:
   receiving, from the point of sale system, transaction data corresponding to the first transaction event on the point of sale system; and
   storing at least part of the transaction data in the accumulator table.

6. The computer-implemented method of claim 1, further comprising:
   subsequent to generating the instance of the report, disabling the accumulator flag associated with the report, whereafter even upon determining that a second transaction event for the business entity has completed successfully on the point of sale system, the accumulator table is not populated with any data value from the second transaction event, as a result of the accumulator flag being disabled.

7. The computer-implemented method of claim 6, wherein the accumulator table stores data values only for the plurality of data fields used to generate the identified report, wherein the business event comprises, in respective instances, a store open event and a store close event.

8. The computer-implemented method of claim 7, further comprising:
   subsequent to disabling the accumulator flag associated with the report, enabling the accumulator flag associated with the report; and
   upon determining that the accumulator flag associated with the report is enabled, resuming populating of the accumulator table with the at least one data value.

9. The computer-implemented method of claim 8, wherein populating the accumulator table with the at least one data value comprises:
   receiving, from the point of sale system, transaction data corresponding to the first transaction event on the point of sale system; and
   storing at least part of the transaction data in the accumulator table.

10. The computer-implemented method of claim 9, wherein each of the two or more database tables comprises a respective data transaction table separate from the accumulator table, wherein the point of sale system is operatively connected to an enterprise server via a network, wherein the enterprise server includes a plurality of components including the database management system and a data accumulation component, wherein the data accumulation component is configured to create and automatically populate the accumulator table, wherein the first and second transaction events correspond to distinct transactions on the point of sale system.

11. A system of report generation based on accumulator tables, the system comprising:
    one or more computer processors; and
    a memory containing a program that, when executed by the one or more computer processors, performs an operation comprising:
      identifying a report for a business entity, the report having an associated accumulator flag;
      determining a plurality of data fields across two or more database tables that are used to generate the report, wherein the two or more database tables are located within a database managed by a database management system;

creating an accumulator table within the database, the accumulator table including one or more of the determined plurality of data fields;

upon determining that a first transaction event for the business entity has completed successfully on a point of sale system and that the accumulator flag associated with the report is enabled, automatically populating the accumulator table with at least one data value from the first transaction event and corresponding to at least one of the plurality of data fields, wherein the at least one data value remains stored in the two or more database tables after populating the accumulator table;

upon receiving, from the point of sale system, an indicator of an occurrence of a business event for the business entity, automatically generating an instance of the report by submitting one or more database queries for execution against the populated accumulator table, wherein the database management system does not perform a join operation between the two or more database tables in executing the one or more database queries, wherein the report is not generated using any of the two of more database tables; and upon determining that the accumulator flag associated with the report is disabled, ceasing the populating of the accumulator table with data values for all of the plurality of data fields.

12. The system of claim 11, wherein the business event comprises at least one of a store open event and a store close event.

13. The system of claim 11, wherein the accumulator table stores data values only for the plurality of data fields used to generate the identified report.

14. The system of claim 11, the operation further comprising:

upon determining that the accumulator flag associated with the report is enabled, resuming populating of the accumulator table with the at least one data value.

15. The system of claim 11, wherein populating the accumulator table with the at least one data value comprises:

receiving, from the point of sale system, transaction data corresponding to the first transaction event on the point of sale system; and storing at least part of the transaction data in the accumulator table.

16. A non-transitory computer-readable medium containing a program that, when executed, performs an operation for report generation based on accumulator tables, the operation comprising:

identifying a report for a business entity, the report having an associated accumulator flag;

determining a plurality of data fields across two or more database tables that are used to generate the report, wherein the two or more database tables are located within a database managed by a database management system;

creating an accumulator table within the database, the accumulator table including one or more of the determined plurality of data fields;

upon determining that a first transaction event for the business entity has completed successfully on a point of sale system and that the accumulator flag associated with the report is enabled, automatically populating, by operation of one or more computer processors when executing the program, the accumulator table with at least one data value from the first transaction event and corresponding to at least one of the plurality of data fields, wherein the at least one data value remains stored in the two or more database tables after populating the accumulator table; and upon receiving, from the point of sale system, an indicator of an occurrence of a business event for the business entity, automatically generating an instance of the report by submitting one or more database queries for execution against the populated accumulator table, wherein the database management system does not perform a join operation between the two or more database tables in executing the one or more database queries, wherein the report is not generated using any of the two of more database tables; and upon determining that the accumulator flag associated with the report is disabled, ceasing the populating of the accumulator table with data values for all of the plurality of data fields.

17. The non-transitory computer-readable medium of claim 16, wherein the accumulator table stores data values only for the plurality of data fields used to generate the identified report.

18. The non-transitory computer-readable medium of claim 16, wherein the business event comprises at least one of a store open event and a store close event.

19. The non-transitory computer-readable medium of claim 16, the operation further comprising:

upon determining that the accumulator flap associated with the report is enabled, resuming populating of the accumulator table with the at least one data value.

20. The non-transitory computer-readable medium of claim 16, wherein populating the accumulator table with the at least one data value comprises:

receiving, from the point of sale system, transaction data corresponding to the first transaction event on the point of sale system; and storing at least part of the transaction data in the accumulator table.

* * * * *

UNITED STATES PATENT AND TRADEMARK OFFICE
CERTIFICATE OF CORRECTION

PATENT NO. : 10,152,682 B2
APPLICATION NO. : 14/280381
DATED : December 11, 2018
INVENTOR(S) : Julia Patten Bond et al.

It is certified that error appears in the above-identified patent and that said Letters Patent is hereby corrected as shown below:

In the Claims

In Column 14, Line 41, in Claim 19, delete "flap" and insert -- flag --, therefor.

Signed and Sealed this
Twenty-first Day of May, 2019

Andrei Iancu
*Director of the United States Patent and Trademark Office*